(12) United States Patent
Malkin et al.

(10) Patent No.: US 9,699,131 B2
(45) Date of Patent: *Jul. 4, 2017

(54) USER INTERFACE WITH RECIPIENT STATUS INDICATION

(71) Applicant: International Business Machines Corporation, Armonk, NY (US)

(72) Inventors: Peter K. Malkin, Hawthorne, NY (US); Jacquelyn A. Martino, Cold Spring, NY (US); Justin D. Weisz, Stamford, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/963,672

(22) Filed: Aug. 9, 2013

(65) Prior Publication Data

US 2014/0207880 A1 Jul. 24, 2014

Related U.S. Application Data (63) Continuation of application No. 13/748,896, filed on Jan. 24, 2013.

(51) Int. Cl.
*H04L 12/58* (2006.01)
*G06F 3/01* (2006.01)

(52) U.S. Cl.
CPC .............. *H04L 51/24* (2013.01); *G06F 3/016* (2013.01); *H04L 51/043* (2013.01)

(58) Field of Classification Search
CPC ........ H04L 51/24; H04L 51/043; G06F 3/016
(Continued)

(56) References Cited

U.S. PATENT DOCUMENTS 7,373,144 B1 * 5/2008 Kirkpatrick ......... H04L 12/5855
455/421
7,500,200 B2 3/2009 Kelso et al.
(Continued)

FOREIGN PATENT DOCUMENTS

CN 101729446 6/2010
EP 2154922 A1 2/2010
EP 2254309 A1 11/2010

OTHER PUBLICATIONS

H. Schulzrinne; "Indication of Message Composition for Instant Messaging (RFC3994)"; Jan. 1, 2005 IP.com No. IPCOM000039276D, pp. 1-13.
(Continued)

*Primary Examiner* — Arvin Eskandarnia
*Assistant Examiner* — Javier O Guzman
(74) *Attorney, Agent, or Firm* — Scully, Scott, Murphy & Presser, P.C.; Alexa L. Ashworth, Esq.

(57) ABSTRACT

A method of providing a user interface with recipient status information, in one aspect, may comprise detecting a message (e.g., online message such as instant messaging, chat, etc.) being initiated by a first user to a second user; gathering information associated with the second user; analyzing the gathered information; predicting a state of the second user based on the analyzing; and determining a notification action based on the predicted state of the second user, the notification action notifying the first user of the second user's state; and presenting a notification comprising one or more of graphical, textual, auditory, or tactile indications or combinations thereof to the first user.

15 Claims, 5 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,352,560 | B2* | 1/2013 | O'Sullivan | G06Q 10/107 709/206 |
| 2002/0024947 | A1* | 2/2002 | Luzzatti | H04L 12/6418 370/352 |
| 2004/0223599 | A1* | 11/2004 | Bear et al. | 379/207.02 |
| 2006/0005133 | A1 | 1/2006 | Lyle et al. | |
| 2007/0071209 | A1* | 3/2007 | Horvitz | G06Q 10/109 379/201.06 |
| 2007/0121873 | A1* | 5/2007 | Medlin | H04M 3/4285 379/210.01 |
| 2008/0184170 | A1 | 7/2008 | Periyalwar | |
| 2009/0063677 | A1 | 3/2009 | Forlenza et al. | |
| 2009/0265643 | A1 | 10/2009 | Jachner et al. | |
| 2011/0136493 | A1* | 6/2011 | Dimpflmaier et al. | 455/450 |
| 2011/0264733 | A1* | 10/2011 | Klassen et al. | 709/203 |
| 2011/0320536 | A1* | 12/2011 | Lobb et al. | 709/205 |
| 2012/0117489 | A1 | 5/2012 | Bank et al. | |
| 2012/0190345 | A1* | 7/2012 | Abdel-Kader | 455/414.1 |
| 2012/0297322 | A1* | 11/2012 | Malik | G06Q 10/107 715/758 |
| 2013/0293384 | A1* | 11/2013 | Reyes | H04W 48/04 340/669 |
| 2013/0310055 | A1* | 11/2013 | Dewing | H04W 76/025 455/450 |
| 2014/0004891 | A1* | 1/2014 | Baca | H04W 4/12 455/466 |
| 2014/0297786 | A1* | 10/2014 | Caskey | H04L 67/306 709/217 |

OTHER PUBLICATIONS

Anonymous; "System, Method and Appratus for Providing Per-contact Status Information within an Instant-messaging System"; Mar. 11, 2012; IP.com No. IPCOM000215762D, pp. 1-4.

Wikipedia, Instant messaging, http://en.wikipedia.org/wiki/Instant_mmessaging, last modified on Jan. 20, 2013, pp. 1-12.

Office Action dated Jun. 29, 2016 received in U.S. Appl. No. 13/748,896, 13 pages.

Office Action dated Oct. 25, 2016 received in U.S. Appl. No. 13/148,896, 17 pages.

* cited by examiner

FIG. 1

|  | 25 |  | 26 |  | 27 |
|---|---|---|---|---|---|
| 01:00 PM | getting inventi | 10:00 AM | Review of DIS | 11:00 AM | MTG. & CON |
| 03:00 PM | S: Inventor Er | 01:00 PM | Review of DIS | 03:00 PM | S: CIL Workir |
|  |  | 02:30 PM | Rochelle |  |  |
|  |  | 04:00 PM | XYZ Journal i |  |  |

USER INTERFACE WITH RECIPIENT STATUS INDICATION

CROSS-REFERENCE TO RELATED APPLICATIONS

This application is a continuation of U.S. Ser. No. 13/748,896, filed on Jan. 24, 2013, the entire content and disclosure of which is incorporated herein by reference.

FIELD

The present application relates generally to computers, computer applications, and communications such as messaging, and more particularly to user interface with recipient status indication.

BACKGROUND

Known art gather "activity level" from instant-message users and provides a "busy gauge" to others that indicates the user's activity level. The user's activity is computed automatically based upon the user's interaction with their computer system. An input tracking routine records the user's input frequency, such as mouse clicks, voice inputs, keyboard inputs, and other inputs in order to determine the user's activity level. The recorded activity data is compared with activity level thresholds that can be either default thresholds or user-specified. The user can select to use a manual input level in which the user specifies the user's activity level despite the number of input actions received at the user's computer.

BRIEF SUMMARY

In one embodiment of the present disclosure, recipient status information may be provided, e.g., via a user interface. In one aspect, a method for providing a user interface with recipient status information, may comprise detecting an instant message being initiated by a first user's device to a second user's device. The method may also comprise gathering information associated with the second user. The method may further comprise analyzing the gathered information. The method may also comprise predicting a state of the second user based on the analyzing. In one aspect, the state of the second user may comprise one or more non-activity-level characteristics associated with the second user's device. The method may also comprise determining a notification action based on the predicted state of the second user. The notification action in one aspect is for notifying a first user associated with the first user's device of the second user's state. The method may further comprise presenting a notification comprising one or more of graphical, textual, auditory, or tactile indications or combinations thereof to the first user.

A system for providing a user interface with recipient status information, in one aspect, may comprise a user interface module operable to execute on a processor, and further operable to detect an instant message being initiated by a first user's device to a second user's device. An analyzer module may be operable to execute on the processor, and further operable to gather information associated with a second user associated with the second user's device and analyze the gathered information. A forecast module may be operable to execute on the processor, and further operable to predict a state of the second user based on the analyzing. In one aspect, the state of the second user comprises one or more non-activity-level characteristics associated with the second user's device. An action module may be operable to execute on the processor, and further to determine a notification action based on the predicted state of the second user, the notification action for notifying a first user associated with the first user's device of the second user's state. The user interface module may be further operable to present a notification comprising one or more of graphical, textual, auditory, or tactile indications or combinations thereof to the first user's device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Disclosed in one embodiment is an instant-messaging system or the like, or another communication system, in which the user's instant-messaging window (or another presentation window or panel on a user's device) provides a graphical indication of one or more of the following characteristics of the recipient of the message: 1) battery (charge) level of remote recipient's device, 2) phone call coming in for remote recipient, 3) quality of service for remote recipient's device (e.g., quality of network connectivity), 4) movement of remote recipient's device (e.g., remote accelerometer indicates user is in a car), 5) geolocation of the recipient's device (e.g., GPS coordinates), 6) the presence of individuals who are near to the recipient (e.g., as determined by motion detectors, network co-presence, or geolocation), 7) calendar information of recipient (e.g., a meeting will occur within 1 minute). Forecasts may be also made to predict recipient states. In one embodiment of the present disclosure, the state of the user is not necessarily the current interaction with the user device, e.g., whether or not the user is actively interacting with the device. Rather the state of the recipient user may comprise information, e.g., the above-described characteristics associated with the user's device and information stored or available via the user's device. In one aspect, such characteristics are referred to as "non-activity-level characteristics" or NAL, which may comprise characteristics not directly involving user interactions or lack of interactions with a device. On the other hand, the "activity-level" characteristics may include user's input frequency, such as mouse clicks, voice inputs, keyboard inputs, and other inputs in order to determine the user's activity level. As described above, the present disclosure's NAL characteristic, in one embodiment, comprise such characteristics as battery (charge) level second user's device, phone call coming in for the second user, quality of service associated with the second user's device, movement of the second user's device, geolocation of the second user's device, presence of one or more individuals in proximity to the second user (e.g., proximity defined by a distance threshold), or calendar information associated with the second user, or combinations thereof, and/or other such characteristics.

Instant messaging (IM) refers to an online communication, e.g., over a network, between users (senders and receivers) using devices or computing devices such as desktop computers, laptop computers, smartphones, cell phones, tablets, and other devices. An IM server or application allows the users to communicate and communicate the messages to the users. Messages are usually typed text, but may include live voice or video, or combinations thereof. Other media may be possible for communicating.

Figure 1:
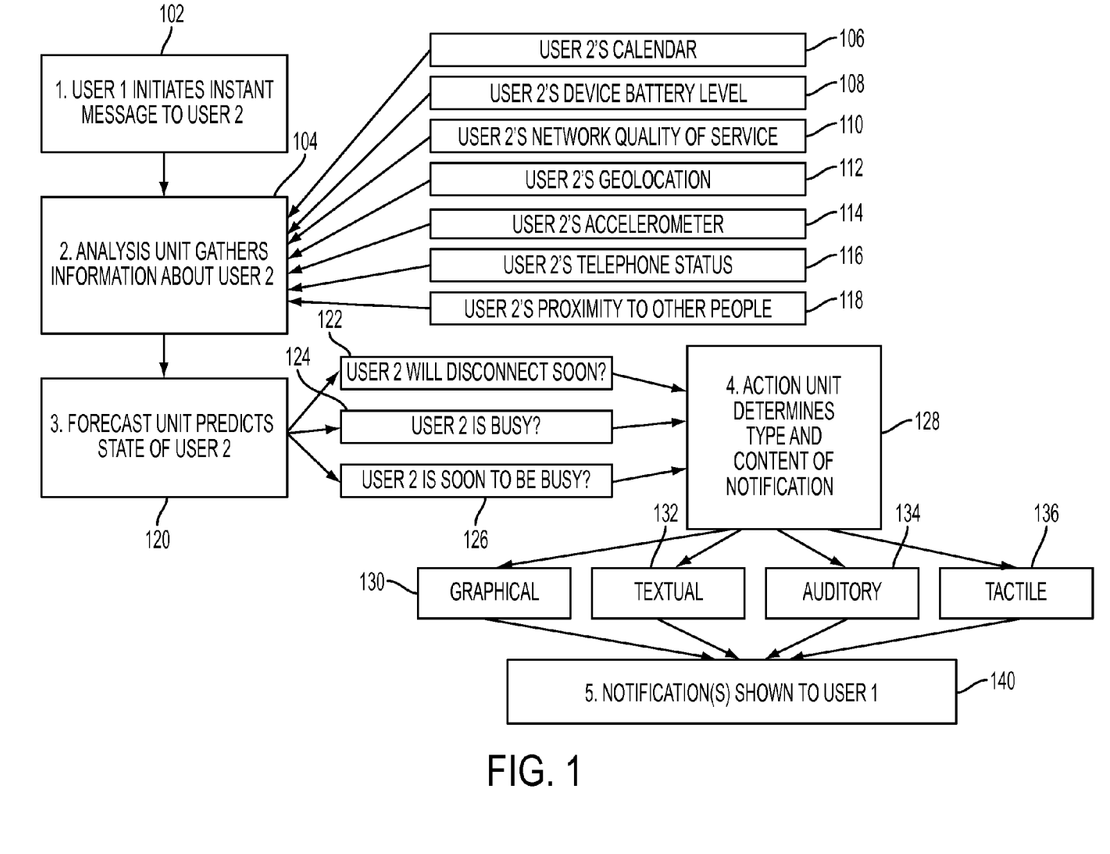
FIG. 1 is an overview of a methodology of the present disclosure in one embodiment that provides a user interface with recipient status indication.

FIG. 1 is an overview of a methodology of the present disclosure in one embodiment that provides a user interface with recipient status indication. At 102, a user (e.g., referred to as User 1 or a first user) initiates an instant message to another user, e.g., a remote user (e.g., referred to as User 2 or a second user). A remote user, for example, is using another device from the first user's device in communicating with the first user. A method or system of the present disclosure detects an instant message being initiated by a first user to a second user.

At 104, an analysis unit (AU) or like functionality collects information about the remote user (User 2) and analyzes the information. For example, the AU may gather information such as remote user's electronic calendar 106, device battery level 108, quality of service (QOS) of the network 110 used by User 2, geolocation 112, accelerometer 114, telephone status 116 and/or proximity to other people 118. Proximity may be defined by a threshold, e.g., within a defined distance value. Other information may be also gathered and analyzed. User 2's geolocation may be determined based on GPS signal received from that user's device and determining location of User 2 based on the received GPS signal. QOS or quality of network connectivity from that location may be determined based on the history of past services that were available at that location.

As another example, the remote user's calendar may be analyzed to identify or determine User 2's current meetings, meetings nearby in time, the people involved in the meetings, local holidays, trends of User 2 through time with respect to device-usage patterns, etc. In order to protect privacy, this analysis may be performed in an opt-in fashion on the part of User 2, e.g., User 2 may select to block the calendar information from being collected and/or analyzed. In another example, the gathering of data and analysis may be performed in a ways so as not to expose certain aspects of the information. For example, the indication provided to User 1 may simply be a coloration of the instant-message window without User 1 being provided precise information as to the people involved in a meeting that User 2 will engage in within T=5 minutes.

One way the remote user's information (e.g., User 2's information) can be collected, for example, is by having the instant messaging (IM) application on the remote user's device periodically report information (e.g., battery level, signal strength, accelerometer data, telephone status, location, etc.) to a central server, such as an IM server. That server can then broker the information to the people (e.g., User 1) who want to contact the remote user (e.g., User 2).

Another way the remote user's information can be collected, for example, is by having the IM applications initiate a direct connection with each other; e.g., when user A wants to initiate contact user B, the IM service helps create a direct connection between user A's device and user B's device, e.g., the way the file transfer feature over IM works. Once the two devices are connected, they can directly exchange information with each other (e.g., battery level, signal strength, etc.)

At 120, a forecast unit (FU) or like functionality predicts makes a forecast with respect to the remote user based on the collected information and analysis of the information at 104. The forecast unit may utilize rule-based algorithm to make forecasts based on the collected information. For example, the forecast unit may predict that User 2 will disconnect soon at 122, e.g., based on the collected information at 104 and analysis thereof, e.g., if the information and analysis signal that User 2's network connecting is poor, User 2 device's battery level is low or about to deplete, User 2's calendar indicate that User 2 has another engagement scheduled in the very near future, etc. For example, the forecast unit may detect a low device battery level for User 2 and determine that they will disconnect from the instant messaging service within a few minutes. Or it may use geolocation and accelerometer data of User 2's device to determine that it is about to enter an area with poor network coverage and determine that it may soon disconnect from the instant messaging service. The forecast unit may make use of "historical" data for User 2, for example, a history of being in an area of poor QOS when in a certain location in the past.

As another example, the forecast unit may predict at 124 that User 2 is busy, e.g., based on the collected information at 104 and analysis of that information, for example, if User 2's calendar indicates that User 2 is currently engaged with another matter, User 2 is currently on the phone, etc.

Yet as another example, the forecast unit may predict at 126 that User 2 is soon to be busy, e.g., based on the collected information at 104 and analysis of that information, for example, if User 2's calendar indicates that User 2 has another matter scheduled that is to take place soon.

At 128, an action unit computes action as a function of the output from the analysis unit and forecast unit, e.g., compute "Action"=FunctionOf(AU, FU). The predictions of the forecast unit are combined with data collected by the analysis unit to determine an action to be performed in User 1's user interface. This action may include graphical indications 130 such as a change in IM status, a notification message (e.g., a pop-up window or a smartphone notification), a change in mark, icon, or color of User 2's representation in the buddy list, or a change in placement of User 1's conversation window with User 2. This action may also be tactile 136 or auditory 134, such as a vibration of User 1's smartphone or by playing a sound or music file. Such vibrations or sounds may be configurable on a per-user basis (e.g., different vibration patterns or different sounds for different IM buddies). The action may also be textual 132, e.g., a text notification.

At 140, based on the computed action, a graphical, textual, audio, or tactile indication of User 2's status as determined from 104, 120 and 128 is provided to User 1. For example, one or more of the graphical, textual, tactile, or auditory action determined at 128 is rendered to User 1. Other form of notification may be utilized. This action rendering can be performed before User 1 intends to type a message to User 2 (e.g., User 2's IM status changes when their device battery level drops to a low level), or it can be performed when User 1 takes steps to initiate contact with User 2 (e.g., they begin to type a message to User 2 and receive auditory feedback because User 2 just began a meeting). For instance, real-time multimedia feedback may be returned.

Figure 2:
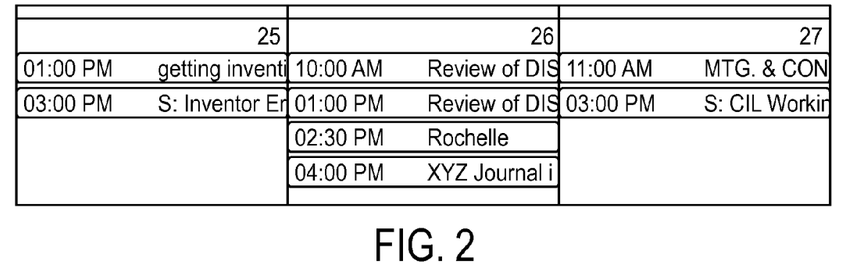
FIG. 2 shows an example of a recipient's calendar, e.g., collected and analyzed according a method shown in FIG. 1.

The following illustrates a use case scenario for the methodology of the present disclosure in one embodiment. FIG. 2 shows an example of User 2's calendar, e.g., collected and analyzed according a method shown in FIG. 1. User 1 initiates an instant message, or chat, with User 2 (named "WorkBuddy3") at 12:59 PM on July 26th. The analyzer unit AU and the forecast unit FU detect that at 1:00 PM, there will be a meeting with User 2. As a result of this forecast of an attention interrupt, or meeting, for User 2 within T=1 minute, a sparkle graphic appears by WorkBuddy3's name. Note that recipient WorkBuddy3 need not take any special action to specify that he will be busy in 1 minute.

Figure 3:
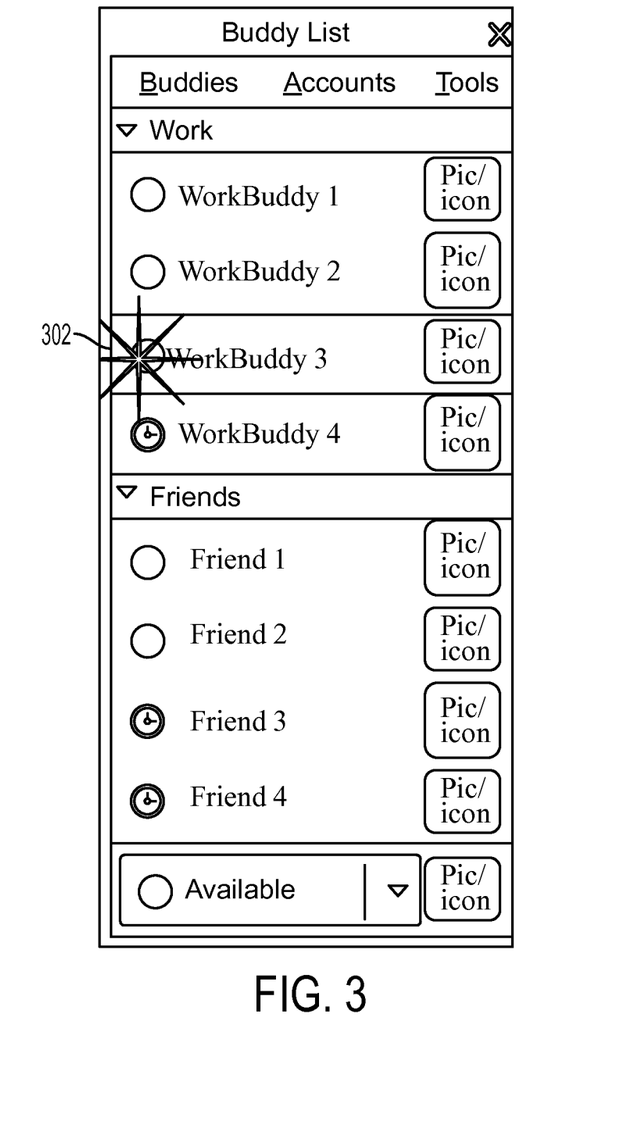
FIG. 3 shows a display window with graphical indication for an instant-message region in one embodiment of the present disclosure.

Additionally, the color of the instant-message window may also indicate that recipient WorkBuddy3 is likely to be busy within 1 minute, or that his battery level is low, or that his quality of service (QOS) is likely to be low in 1 minute, based on a record of historical usage patterns. For example, the instant-message window may change color, size, texture, blink rate, intensity, or have a symbol to indicate status of User 2. FIG. 3 shows a display window with graphical indication for an instant-message region in one embodiment of the present disclosure. The window shows an indication 302 related to User 2 ("WorkBuddy3").

Figure 4:
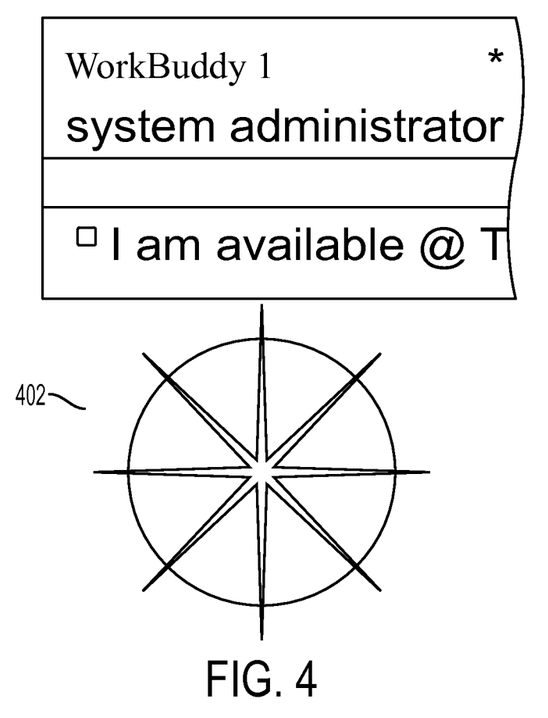
FIG. 4 shows an example of an actual window for an instant messaging region.

FIG. 4 shows an actual window for an instant messaging region. In this example, the sparkle symbol 402 indicates that WorkBuddy1 has a battery level less than a certain level, or that he is likely to have poor quality of service within a minute, or that his phone has just rang and/or he is on the phone. Normally User 1 would be typing into the region marked by the sparkle symbol 402 as User 1 initiates a message to User 2. However, the displayed symbol serves as a notification to User 1 that User 2 would be busy for instant messaging.

A methodology of the present disclosure may be integrated with or used with an instant messaging system. An analysis provides the state of a recipient of an instant message. This state need not be associated with the recipient user's current interactions with the computing device, e.g., the recipient is typing furiously. Rather, the state provides for information such as the recipient's battery state is low and the recipient's calendar entry indicates a meeting within x amount of time, e.g., 3 minutes. Graphical, tactile, and/or auditory indications of recipient state may be provided to a user other than the recipient.

Hence, in one embodiment, the recipient state may comprise one or more of battery (charge) level of remote recipient's device, phone call coming in for remote recipient, quality of service for remote recipient's device (e.g., quality of network connectivity, movement of remote recipient's device (e.g., remote accelerometer indicates user is in a car), geolocation of the remote recipient's device (e.g., GPS coordinates), the presence of individuals who are near the recipient, (e.g., as determined by motion detectors, network co-presence, or geolocation), calendar information (e.g., meetings that recipient has for the next few hours).

In one embodiment, the state is a forecast of recipient state (e.g., in 2 minutes, the recipient will likely have poor quality of service, the battery is likely to die, the connection is likely to be lost, etc.). The graphical indication may comprise any of color, intensity, blink rate, window size/shape, multimedia, text, audio, and others. The tactile indication may comprise a pattern of device vibration, which may be customized for each individual remote recipient. The auditory indication may comprise a sound or music file, which may be customized for each individual remote recipient.

In one embodiment, the state comprise information on number of other instant-message windows on screen of the recipient, number of active instant-message windows on screen, or number of other applications open, or combinations thereof, and/or others. Such information may be known to the IM application or server, such as the number of IM conversations taking place. In one example, the logic or methodology of the present disclosure may be integrated with an IM application, e.g., exist inside of the IM application, in which case such information is readily available. In another example, hooks or APIs may be implemented and/or used to access this information. Other information, such as the number of other open applications, may be known to the underlying operating system; APIs may be used to query for this information.

In one embodiment, the recipient may define and apply customized rules to their state to be used in conjunction with the state analysis. For instance, the recipient via a graphical user interface or like functionality may select and/or specify options that define and apply customized rules.

A client graphical user interface (GUI) may provide indication of certain statuses of the recipient. An online synchronous communication may be obtained between a first user and second user, monitoring the status of the second user, and providing graphical, tactile, and/or auditory indications in the first user's client interface of the status of the second user. As described above, the statuses may comprise battery strength, network signal strength, level of activity in other applications, speed and acceleration of user's device, mode of transportation (if any), the number of additional conversations the second user is currently in, whether there is anyone in the second user's room or close proximity (particularly someone with whom the second user is talking), or whether the second user is involved in one or more telephone calls, or combinations thereof. User B's device may collect the information and reports it to a central server or directly to user A's device.

A graphical indication may comprise using particular background colors to indicate particular types of operational status, e.g., blue to indicate the number of concurrent chats, green to indicate network strength. An intensity of each color of graphical indication may be used to represent the level of the associated operational status (e.g., light blue indicates only few concurrent conversations and "idle communications," while dark blue indicates many).

A GUI may also provide an alert indicating the battery of the remote user is about to deplete, an alert indicating the network communications of the remote user is about to be lost (e.g., due to little or no signal).

While the methodology of the present disclosure was described with reference to instant messaging, it should be understood that the logic or methodology may be utilized with respect to other communication methods, and the present disclosure need not be limited to instant messaging systems only.

Figure 5:
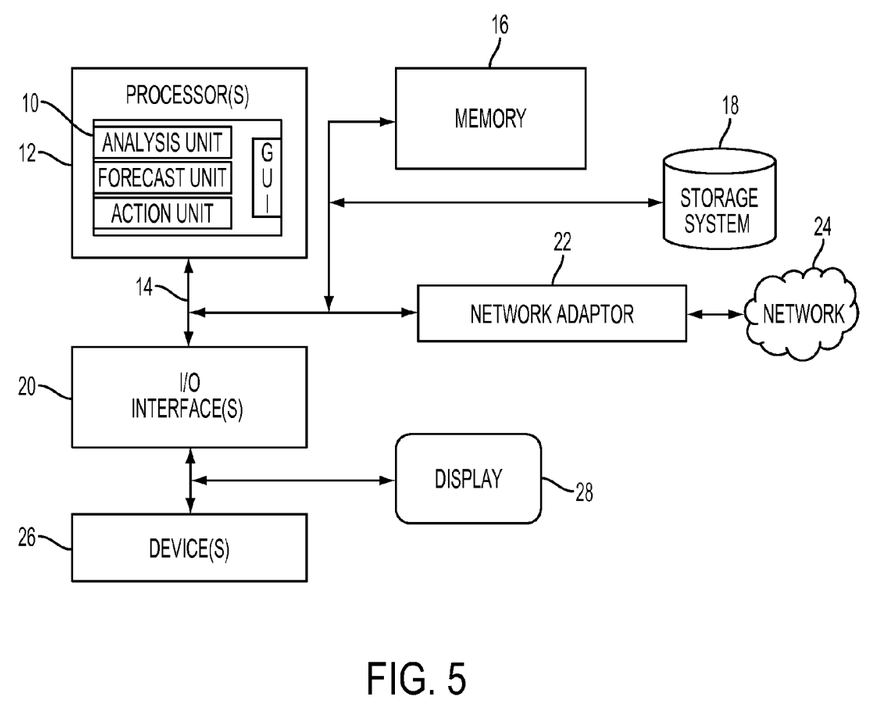
FIG. 5 illustrates a schematic of an example computer or processing system that may implement the system in one embodiment of the present disclosure.

FIG. 5 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method of providing a user interface with recipient status information, comprising:
   detecting an instant message being initiated by a first user's device to a second user's device;
   gathering information associated with a second user associated with the second user's device;
   analyzing the gathered information;
   predicting, by a processor, a state of the second user based on the analyzing, the state of the second user comprising one or more non-activity-level characteristics associated with the second user's device;
   determining a notification action based on the predicted state of the second user, the notification action notifying a first user associated with the first user's device of the second user's state; and
   presenting a notification comprising one or more of graphical, textual, auditory, or tactile indications or combinations thereof to the first user, the notification comprising an alert presented on the first user's device that the second user's device will become unavailable within a specified amount of time, without the second user having to take any action that the second user will not be available within the specified amount of time, the notification comprising the graphical indication displayed in an input area of an instant messaging graphical user interface where the instant message is typed,
   wherein the state of the second user that is predicted comprises geolocation of the second user's device and network connection quality based on the geolocation of the second user's device,
   the predicting of the state comprising forecasting whether the second user's device will disconnect based on predicting whether the second user's device will enter an area with poor network coverage determined based on the geolocation of the second user's device, accelerometer data of the second user's device and historical data of the second user's device being in the area and history of past services that were available in the area, the state of the second user comprising at least speed and acceleration of the second user's device,
   wherein the information associated with the second user is obtained at least by allowing an application supporting the instant message to periodically report the information associated with the second user's device to a server supporting the instant message.

2. The non-transitory computer readable storage medium of claim 1, wherein the state of the second user comprises one or more of battery charge level of a device associated with the second user, phone call coming in for the second user, quality of service associated with the second user's device, movement of the second user's device, geolocation of the second user's device, presence of one or more individuals in proximity to the second user, or calendar information associated with the second user, or combinations thereof.

3. The non-transitory computer readable storage medium of claim 1, wherein the state is a forecast of the second user's state.

4. The non-transitory computer readable storage medium of claim 1, wherein the notification comprises the graphical indication and the graphical indication comprises one or more of color, intensity, blink rate, window size, window shape, multimedia, or text, audio, or combinations thereof.

5. The non-transitory computer readable storage medium of claim 1, wherein the notification comprises the tactile indication and the tactile indication comprises a pattern of device vibration.

6. The non-transitory computer readable storage medium of claim 5, wherein the pattern of device vibration is customized for the second user.

7. The non-transitory computer readable storage medium of claim 1, wherein the notification comprises the auditory indication and the auditory indication comprises a sound or music file, or combination thereof.

8. The non-transitory computer readable storage medium of claim 7, wherein the sound or music file is customized for the second user.

9. The non-transitory computer readable storage medium of claim 1, wherein the state comprises information on a number of other instant-message windows on a screen of the second user, a number of active instant-message windows on the screen, a number of other applications open, or combinations thereof.

10. The non-transitory computer readable storage medium of claim 1, the second user is enabled to define and apply customized rules to the state in the analyzing.

11. A system for providing a user interface with recipient status information, comprising:
    a processor;
    a user interface operable to execute on the processor, and further operable to detect an instant message being initiated by a first user's device to a second user's device;
    the processor operable to execute on the processor, and further operable to gather information associated with a second user associated with the second user's device and analyze the gathered information;
    the processor further operable to execute on the processor, and further operable to predict a state of the second user based on the analyzing, the state of the second user comprising one or more non-activity-level characteristics associated with the second user's device; and
    the processor further operable to execute on the processor, and further to determine a notification action based on the predicted state of the second user, the notification action for notifying a first user associated with the first user's device of the second user's state,
    the user interface further operable to present a notification comprising one or more of graphical, textual, auditory, or tactile indications or combinations thereof to the first user's device, the notification comprising an alert presented on the first user's device that the second user's device will become unavailable within a specified amount of time, without the second user having to take any action that the second user will not be available within the specified amount of time, the notification comprising the graphical indication displayed in an input area of the graphical user interface where the instant message is typed, wherein the state of the second user that is predicted comprises geolocation of the second user's device and network connection quality based on the geolocation of the second user's device, the processor operable to forecast whether the second user's device will disconnect based on predicting whether the second user's device will enter an area with poor network coverage determined based on the geo-location of the second user's device, accelerometer data of the second user's device and historical data of the second user's device being in the area and history of past services that were available in the area, the state of the second user comprising at least speed and acceleration of the second user's device, wherein the information associated with the second user is obtained at least by allowing an application supporting the instant message to periodically report the information associated with the second user's device to a server supporting the instant message.

12. The system of claim 11, wherein the state of the second user comprises one or more of phone call coming in for the second user, quality of service associated with the second user's device, movement of the second user's device, presence of one or more individuals in proximity to the second user, or calendar information associated with the second user, or combinations thereof.

13. The system of claim 11, wherein the state is a forecast of the second user's state.

14. The system of claim 11, wherein the notification comprises the graphical indication and the graphical indication comprises one or more of color, intensity, blink rate, window size, window shape, multimedia, or text, audio, or combinations thereof.

15. The system of claim 11, wherein the notification comprises the tactile indication and the tactile indication comprises a pattern of device vibration.

* * * * *